United States Patent
Clochard et al.

(10) Patent No.: US 10,322,741 B2
(45) Date of Patent: Jun. 18, 2019

(54) METHOD OF INTERACTION FROM THE STEERING WHEEL BETWEEN A USER AND AN ONBOARD SYSTEM EMBEDDED IN A VEHICLE

(71) Applicants: CONTINENTAL AUTOMOTIVE FRANCE, Toulouse (FR); CONTINENTAL AUTOMOTIVE GmbH, Hannover (DE)

(72) Inventors: Pascal Clochard, Chevreuse (FR); Jerome Wroblewski, Mainvilliers (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/534,339

(22) PCT Filed: Dec. 3, 2015

(86) PCT No.: PCT/EP2015/002440
§ 371 (c)(1),
(2) Date: Jun. 8, 2017

(87) PCT Pub. No.: WO2016/091368
PCT Pub. Date: Jun. 16, 2016

(65) Prior Publication Data
US 2017/0341676 A1 Nov. 30, 2017

(30) Foreign Application Priority Data
Dec. 9, 2014 (FR) ...................................... 14 62122

(51) Int. Cl.
*B62D 1/04* (2006.01)
*B62D 1/06* (2006.01)
(Continued)

(52) U.S. Cl.
CPC .............. *B62D 1/046* (2013.01); *B60K 35/00* (2013.01); *B60K 37/06* (2013.01); *B62D 1/06* (2013.01);
(Continued)

(58) Field of Classification Search
CPC .......... B62D 1/046; B62D 1/06; B60K 35/00; B60K 37/06; G06F 3/0482; G06F 3/04842; G06F 3/0485; G06F 3/04883
(Continued)

(56) References Cited

U.S. PATENT DOCUMENTS

2005/0021190 A1* 1/2005 Worrell .................. B60K 35/00
701/1
2006/0070795 A1 4/2006 Meissner
(Continued)

FOREIGN PATENT DOCUMENTS

CN 1771158 5/2006
DE 10 2010 053 663 A1 8/2011
(Continued)

OTHER PUBLICATIONS

International Search Report, dated Mar. 30, 2016, from corresponding PCT application.

*Primary Examiner* — Yazan A Soofi
(74) *Attorney, Agent, or Firm* — Young & Thompson

(57) ABSTRACT

Disclosed is a method for automotive vehicle including a steering wheel, an instrument cluster, the steering wheel including sensors which are arranged on the rim and configured to detect the presence of fingers (5) of a hand (4) of the driver in contact with the rim (25), situated one after the other in the circumferential direction, the method including the following steps: a) defining first and second zones of activation on the rim of the steering wheel, b) defining first and second interaction entities in the digital display zone,
(Continued)

which are situated in positional correspondence with the activation zones, c) detecting a movement of fingers including at least one closing or gripping of a hand on an activation zone, d) undertaking an action in conjunction with the first interaction entity.

20 Claims, 4 Drawing Sheets

(51) Int. Cl.
 *B60K 35/00*  (2006.01)
 *B60K 37/06*  (2006.01)
 *G06F 3/0482*  (2013.01)
 *G06F 3/0485*  (2013.01)
 *G06F 3/0488*  (2013.01)
 *G06F 3/0484*  (2013.01)

(52) U.S. Cl.
 CPC .......... *G06F 3/0482* (2013.01); *G06F 3/0485* (2013.01); *G06F 3/04842* (2013.01); *G06F 3/04883* (2013.01); *B60K 2350/1036* (2013.01); *B60K 2350/1052* (2013.01); *B60K 2350/928* (2013.01)

(58) Field of Classification Search
 USPC .............................................. 701/36
 See application file for complete search history.

(56) References Cited

U.S. PATENT DOCUMENTS

| | | | | |
|---|---|---|---|---|
| 2011/0030502 | A1* | 2/2011 | Lathrop | B60K 37/06 74/552 |
| 2011/0169750 | A1* | 7/2011 | Pivonka | B60K 35/00 345/173 |
| 2012/0271500 | A1* | 10/2012 | Tsimhoni | B62D 1/28 701/23 |
| 2014/0022070 | A1* | 1/2014 | Golomb | B60Q 1/0082 340/475 |
| 2014/0081521 | A1* | 3/2014 | Frojdh | H04M 1/72583 701/36 |
| 2015/0367859 | A1* | 12/2015 | Roth | B60K 37/00 701/36 |

FOREIGN PATENT DOCUMENTS

| | | |
|---|---|---|
| EP | 0 911 750 A2 | 4/1999 |
| GB | 2 423 808 A | 9/2006 |
| JP | 2009-248629 A | 10/2009 |
| WO | 2007-076830 | 7/2007 |

* cited by examiner

METHOD OF INTERACTION FROM THE STEERING WHEEL BETWEEN A USER AND AN ONBOARD SYSTEM EMBEDDED IN A VEHICLE

BACKGROUND OF THE INVENTION

Field of the Invention

The present invention concerns methods and systems allowing a driver to interact with a display device of a motor vehicle from the steering wheel of the vehicle, especially in a steering situation, particularly when the vehicle is moving.

Description of the Related Art

More precisely, there is an interest in methods and systems allowing a driver to interact in an intuitive, safe and easy manner with an instrument cluster, in order to respond to a request and/or to initiate an action with regard to an onboard system of the vehicle (control system or communication system). More particularly, preference is given to an interaction allowing the driver to express a wish with regard to an onboard system of the vehicle by means of a graphic entity displayed on the cluster and by means of a gesture performed by contact with the steering wheel and this without touching the surface of the instrument cluster.

It is known, from document GB 2 423 808, how to arrange a sensory touch surface (touch screen), for example on the central console, which allows a cursor to be moved on the instrument cluster. However, this solution means that the driver will move one of his or her hands on the touch screen which is at a distance from the steering wheel, which is not optimal in terms of driving safety.

It is likewise known from document U.S. 2011 169 750 how to use touch screens located on the main cushion of the steering wheel in order to interact with a graphic element; however, this requires relaxing the normal grip on the steering wheel to execute the maneuver.

BRIEF SUMMARY OF THE INVENTION

Thus, there is a need to propose an improved solution to enable safer interactions of the driver with one or more control or communication systems via the instrument cluster.

According to the invention, there is proposed a method for a motor vehicle, the vehicle comprising a steering wheel connected to the steering system of the vehicle, an instrument cluster comprising a display zone, the steering wheel comprising a plurality of sensors, arranged on the rim and configured to detect the presence of at least one finger of at least one hand of the driver in contact with or in proximity to the rim, situated one after the other in the circumferential direction, the method involving the following steps:
a) defining at least a first zone of activation on the rim of the steering wheel,
b) defining in the display zone at least a first interaction entity situated in positional correspondence with the first activation zone, and representative of an event or a functionality,
c) detecting a voluntary movement of fingers representative of at least one closing of the hand on the first zone of activation,
d) undertaking an action associated with the first interaction entity.

The method according to the invention is notable in that, during step c), the voluntary movement of the fingers is representative of a multiple closing or gripping of the hand on the corresponding zone of activation, namely, a double closing or a triple closing.

Thanks to such a method, one obtains an interaction by a simple and intuitive gesture on the steering wheel in interaction with the instrument cluster in order to initiate an action with regard to a system of the vehicle.

Advantageously, the driver keeps his or her hands on or in the immediate vicinity of the steering wheel, without touching the cluster, and maintaining a good control of the steering wheel.

Moreover, a maneuver is thus proposed which resembles a double click or a double tap, which is widely used at present in various man-machine interfaces.

The voluntary movement of the fingers may be done in a predetermined time slot after the appearance of an event addressed to the driver; this time slot may be of the order of 5 to 10 seconds, and one thus avoids involuntary consideration of a movement performed outside of this time slot.

In various embodiments of the method according to the invention, one may possibly utilize one or more of the following arrangements:
  the double closing of the hand on the zone of activation is defined by the detecting of at least two fingers in contact with or applying pressure to the rim by at least three contiguous sensors, then an absence of detection at the same sensors, then a new detection at the same sensors, then again an absence of detection at the same sensors. In this way, the considering of a voluntary movement is made more reliable and one eliminates the risks of wrong detection or involuntary initiation.
  at least one second zone of activation is defined on the rim of the steering wheel, and at least one second interaction entity in the display zone, the first and second zones of activation being arranged symmetrically on either side of a vertical median plane of the steering wheel, the first zone of activation encompassing a nominal position of the right hand, and the second zone of activation encompassing a nominal position of the left hand. The driver may thus use both hands very easily to interact with the cluster without taking his or her hands off the steering wheel
  the first interaction entity represents an action of acceptance of a proposal submitted to the driver, while the second interaction entity represents an action of rejection of that proposal. In this way, a very simple interaction is proposed for expressing a binary choice while keeping one's hands on the steering wheel.
  the first interaction entity represents the acceptance of a telephone call while the second interaction entity represents a rejecting of that telephone call, so that this can advantageously supplement a hands-free telephone set.
  the sensors are spaced no more than 15 mm from each other in the circumferential direction, and each of the first and second zones of activation covers an angle sector of the rim between 90° and 180°. In this way, the fingers of the driver can be detected on a sufficiently extensive portion of the rim of the steering wheel, and therefore the gesture of the driver does not need to be precise; it is enough for him or her to choose the left hand or the right hand.
  the movement of the fingers is detected on at least three contiguous fingers; this makes it possible to consider only voluntary movements and to reject certain movements which may be done in natural manner by the driver.

the cluster instantly displays in one of its digital display zones and/or by a heads-up display an image of the steering wheel showing the different zones of interaction available as well as pictograms representative of corresponding actions, so that the driver is informed as to the options offered by voluntary gripping interactions on the rim of the steering wheel.

Furthermore, the invention also deals with a system of interaction for a motor vehicle allowing the above described method to be implemented and comprising a steering wheel connected to the steering system of the vehicle, an instrument cluster comprising a display zone, the steering wheel comprising a plurality of sensors, arranged on the rim of the steering wheel and configured to detect the presence of at least one finger of at least one hand of the driver in contact with or in proximity to the rim of the steering wheel, situated one after the other in the circumferential direction, the rim of the steering wheel defining at least first and second zones of activation, the instrument cluster defining, in the display zone, at least first and second interaction entities situated in positional correspondence with respectively the first and second activation zones, and representative of an event or a functionality, the system being configured to detect a voluntary movement of fingers comprising at least a gripping by the hand on one of the zones of activation, and to undertake an action associated with the interaction entity corresponding to the zone of activation.

BRIEF DESCRIPTION OF THE DRAWINGS

Other aspects, purposes and advantages of the invention will appear upon perusal of the following description of one of its embodiments, given as a nonlimiting example. The invention will also be better understood by looking at the enclosed drawings, in which.

DETAILED DESCRIPTION OF THE PREFERRED EMBODIMENTS

Figure 1:
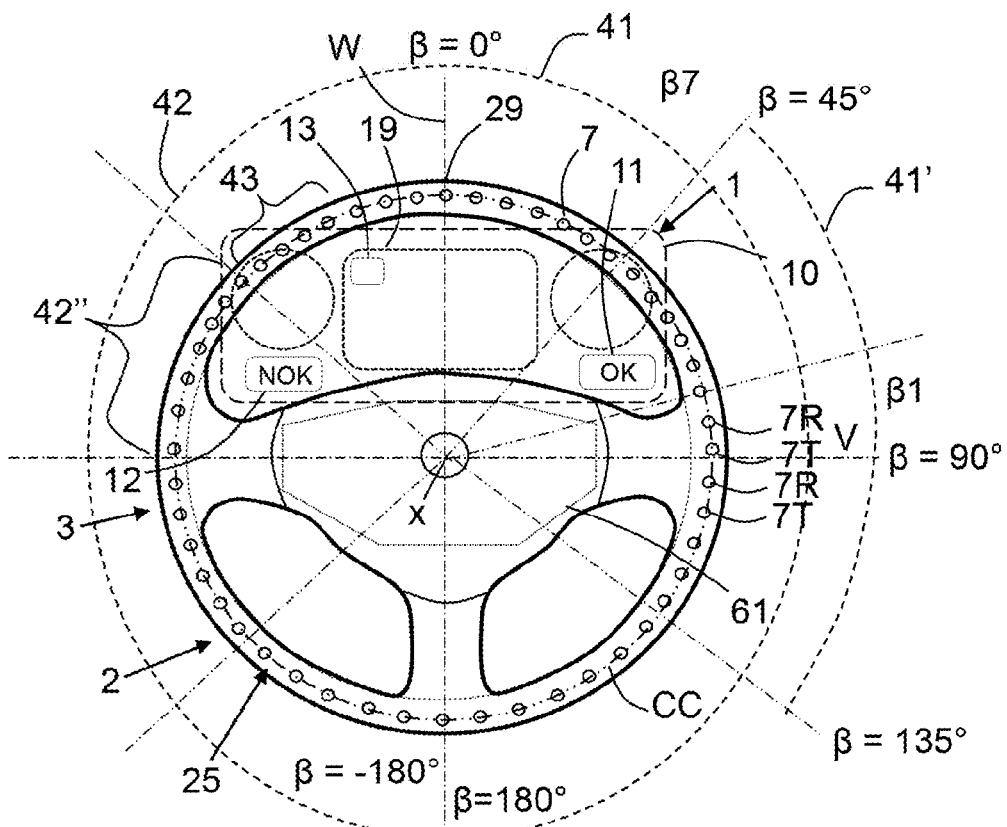
FIG. 1 represents a general diagram of a system in which the method according to the invention may be implemented.

FIG. 1 represents the central zone of the steering column from the viewpoint of the driver (in a situation of driving in a straight line). In the steering column, facing the driver, we find an instrument cluster 1 which, in the present case, comprises a digital display zone 10, 19 (LCD or pixelated), a steering wheel 2 to steer the vehicle, the steering wheel being mounted in rotation about the X axis and comprising a rim 25. The instrument cluster 1 forms a display device which can furthermore comprise various indicator lights, warning lights, dials, which are known in themselves.

Furthermore, the vehicle comprises several onboard systems, such as a hands-free telephone system, systems for monitoring the surroundings of the vehicle, systems alerting the driver as to the driving conditions and upcoming events on the scheduled route of the vehicle.

The instrument cluster 1 comprises, within the display zone 10, a first interaction entity 11 and a second interaction entity 12.

In one simple example illustrated, the first interaction entity is in the form of an "OK" indicator element and the second interaction entity is in the form of a "NOK" indicator element.

In the general display zone 10 of the cluster there is situated a digital display zone 19, pixelated or of LCD type; it should be noted that the interaction entities 11, 12 described above, or others which shall be described below, may of course be located inside the digital zone 19.

"Interaction entity" is understood to mean a graphic object or an indicator light/warning light representative of an event addressed to the driver or a functionality available to the driver. Illustrative examples shall be given below. It is noted that the interaction entity can be representative of an event associated with an embarked system other than the instrument cluster.

The steering wheel 2 comprises a detection device 3 whose principal objective is to detect the presence or absence of finger(s) and secondarily the quality of grasping of the steering wheel 2 by a driver.

The steering wheel 2 comprises a central portion 61 known as the hub and a rim 25 connected to the hub by three spokes in the example illustrated, although the number of spokes may be four or even two, or the steering wheel 2 can be of the single-spoke type.

Figure 2A:
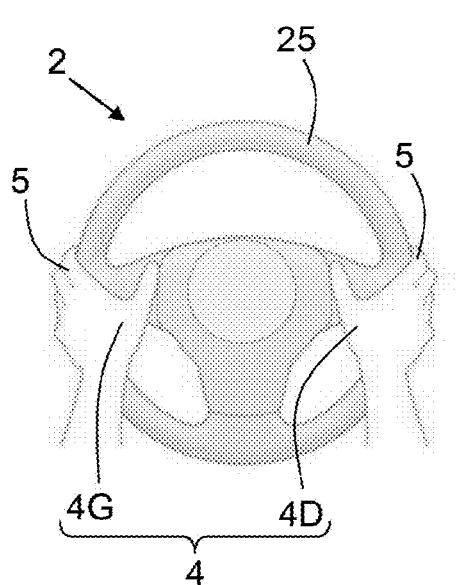
FIGS. 2A and 2B show two driving configurations, respectively with an active holding of the steering wheel and with a gripping movement of the right hand.

The detection device 3 comprises a plurality of sensors 7 arranged on the rim 25 of the steering wheel 2. In FIG. 2A, we see that the hands 4 (the left hand 4G and the right hand 4D) grasp the steering wheel 2 in a "9 and 3" position. Of course, other classic positions such as "10 and 2", two-hand asymmetrical positions, and single-hand positions can also commonly be used by the drivers.

The fingers of the hand 4 of the driver are designated by the reference 5.

On the rim 25 of the steering wheel 2 there are defined zones of activation, which will allow the driver to express a desire with regard to one (or more) interaction entity. More precisely, in reference to FIG. 1, a first zone of activation 41' is defined, extending across an angle sector β1 between 45° and 135° starting from the upper point 29 of the steering wheel 2 (reference β=0°). According to another definition, the first zone of activation 41 extends across an angle sector β7 between 0° and 180° starting from the upper point 29, thus involving here the entire right half of the rim 25 of the steering wheel 2. According to another example, one may define, symmetrically with respect to the plane XW, a second zone of activation 42 which extends between −45° and −135° starting from the upper point 29 of the steering wheel 2 (reference β=0°), or a second zone of activation extending between 0° and −180° starting from the upper point 29, thus involving the entire left half of the rim 25 of the steering wheel 2.

It will be noted that, for a position of driving in a straight line, the first zone of activation 41 on the steering wheel 2 is situated in direct correspondence with the position of the first interaction entity 11 ("OK"), and in analogous manner the second zone of activation 42 is situated in direct correspondence with the position of the second interaction entity 12 ("NOK").

To further improve the intuitiveness for the driver, the graph representing "OK" may be green colored, while the graph representing "NOK" can be red colored.

More generally, according to the present invention one arranges to situate the interaction entities in positional correspondence with the zones of activation on the steering wheel to which they correspond, as seen by the driver.

According to the invention, a particular gesture of the driver performed by one of his or her hands on a zone of activation corresponds to the expressing of a desire on his or her part. This particular gesture, also known in the following as a "voluntary movement of the fingers", corresponds to at least one closing (or "grasping") of the hand on the desired zone of activation.

The definition of the zones of activation on the rim 25 may be contextual and vary according to the case presented to the driver; thus, one can have a second zone of activation 42" on a more restricted angle sector, such as one between −45° and −90° starting from the upper position 29. Of course, in this case there can be more than two zones of activation and more than two interaction entities; for example, a third zone of activation 43 is associated with an icon 13 (third interaction entity) in the digital part of the display 19.

There could also be a single zone of activation and a single interaction entity.

Each zone of activation 41, 42, 43 can be more or less extensive on the rim 25 of the steering wheel 2, and consequently it may involve a larger or smaller number of sensors 7, depending on the driving context (speed of the vehicle, angle of rotation of the steering wheel 2, "steering wheel theta", etc), and/or depending on the events presented to the driver.

Figure 2B:
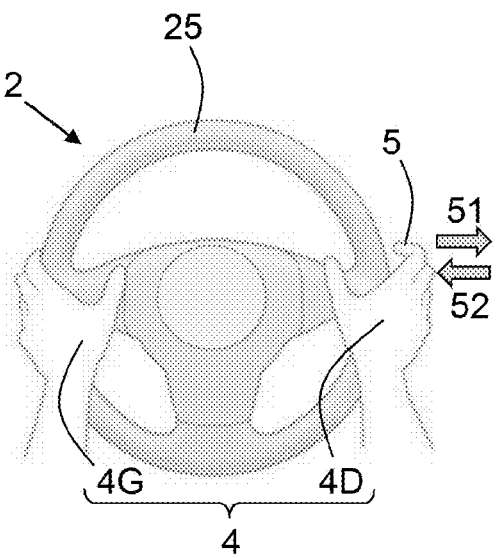

In FIG. 2A, the steering wheel 2 is held normally by the driver. In FIG. 2B, the driver is performing a voluntary action of grasping ("closing") with his or her right hand 4D on a zone of the rim 25 around the "3 o'clock" position at 90°; more precisely, he spreads his fingers 5 using one movement 51 then recloses his fingers 5 on the rim 25 using the movement 52. It is noted that the driver keeps his hand in an adequate position to maintain good control over the course of the vehicle.

Figure 3:
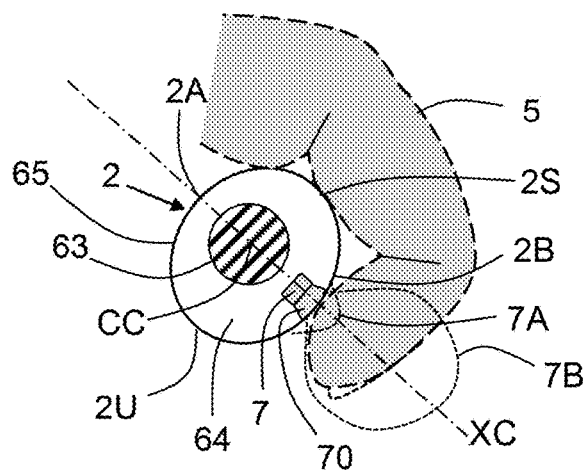
FIG. 3 is a sectional view of the rim of the steering wheel of the system shown in FIG. 1, FIGS. 4A and 4B show detail views of two examples of sensors used in the system represented in FIG. 1.

In the example illustrated in FIG. 3, the rim 25 of the steering wheel 2 has a round or slightly oval section with a first front face 2A directed toward the driver, an opposite face 2B, oriented opposite the view of the driver, an upper face 2S on the outer portion of the rim 25, and an inner face 2U on the interior portion of the rim 25. The median direction of this section of rim 25, parallel to the X axis, is referenced XC.

The rim 25 of the steering wheel 2 comprises a generally metallic framework 63 extending along a circle CC about the axis X of the steering wheel 2. Moreover, the rim 25 of the steering wheel 2 comprises a lining 64 of synthetic material, possibly covered with fabric or leather, the lining 64 possibly having a certain resilience and the exterior surface 65 possibly having a certain roughness for the adherence of the driver's hands.

In the example illustrated, detection sensors 7 are arranged on the side 2B of the rim 25 opposite the face visible to the driver, which makes it possible to detect generally the last joint of the finger 5 of the hand (see FIG. 3). This position of the sensors is also the best suited for them not being visible to the occupants of the vehicle.

However, especially in the case of capacitive sensors not visible from the outside, it will be noted that sensors 7 may also be installed on the exterior upper face 2S. Neither is it ruled out having sensors on the inner face 2U and on the front face 2A.

Preferably, the sensors 7 are arranged one after the other in the circumferential direction CC.

Advantageously, the sensors 7 are distributed over an angle sector of 360°, that is, they preferably cover the entire contour of the rim 25 of the steering wheel 2 along the circumferential direction CC.

It will be noted that it is not ruled out for the sensors 7 to cover a sector less than 360°, for example, of the order of 260°, or even for example of the order of 200°, to coincide with the customary grasping sectors in a statistical population of drivers.

Advantageously, the distribution of the sensors 7 is symmetrical in regard to the upper point 29 of the steering wheel 2 (in a straight line).

According to an advantageous choice, the sensors 7 are spaced apart from one another by a distance E of at most 15 mm in the circumferential direction CC. This provides a sufficient precision to be able to discriminate the different potential objects detected, including the presence of a single finger 5 on the rim 25 of the steering wheel 2. As mentioned above, there can either be a single sensor 7 in a given radial position XC (see FIG. 3) or several 7 sensors distributed at a given radial position XC (on the faces 2A, 2S, 2B).

Figure 4A:
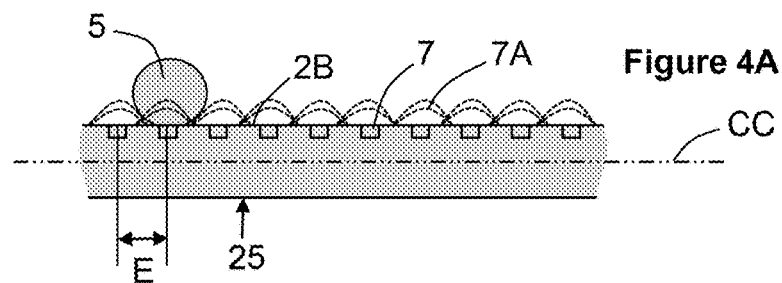

The detection zone, in other words the radius of action of the sensors, can be larger or smaller depending on the technological choice of the sensors 7; in FIG. 4A there are shown relatively small zones of coverage 7A for capacitive sensors.

Figure 4B:
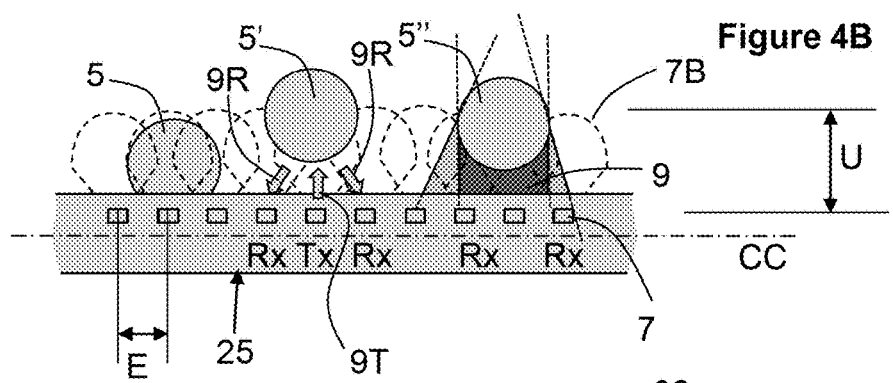

In the example represented in FIG. 4B, the detection sensors 7 are optical sensors of photodiode type with a larger detection zone 7B, which makes it possible to detect the finger 5' near the rim 25 without necessarily being in contact (typically U=1 to 2 cm); a part 70 serving as an optical guide and closing part is arranged between the diodes themselves and the outer wall 65 of the rim 25. The optical closing part 70 is present as an annular band covering the entire surface where the optical sensors are arranged. The optical closing part 70 can be advantageously formed as a "tinted lens" to limit the penetration of radiation in the visible range to the sensors 7, especially in the case where one is working in the infrared range as detailed below. Optionally, one can also place a passive filter centered on the working wavelengths just in front of each photodiode. Such filtering makes it possible to eliminate unused portions of the spectrum and to improve the sensitivity of the detection.

Preferably, a transmitting diode Tx (7T) and a receiving photodiode Rx (7R) will alternate along the circumferential direction CC. In this arrangement, when one of the transmitting diodes 7T is activated, we are interested in particular in the level of light reception at the two adjacent receiving diodes 7R.

More precisely, and in connection with FIG. 4B, when the transmitting diodes Tx are at rest, one measures the quantity of light received by the photodiodes Rx; if one or more photodiodes receive a quantity of light significantly less than the others, this means that a finger 5" is present in proximity to the rim 25 of the steering wheel 2 (in fact, the finger 5" generates a shadow 9 as compared with the natural ambient lighting). When the finger is completely concealing a sensor 7, the light intensity received is basically zero. On the other hand, the majority of the sensors 7 receive the ambient light level in this portion of the compartment of the vehicle, which makes it possible to determine the mean perceived reference light level.

During phases of artificial lighting, one measures the supplemental light 9R provided by the reflection of the infrared illumination 9T furnished by the transmitting diode Tx which is reflected on the finger 5' of the driver. Analysis of the quantity of supplemental light makes it possible to evaluate the distance of the finger in relation to the outer surface 65 of the rim 25 of the steering wheel 2. One thus evaluates the distance with respect to the outer surface 65 of the rim 25 up to U=20 mm.

In order to take account of nighttime driving conditions (compartment very weakly illuminated), for example a source of general ambient lighting may be provided in the instrument cluster, infrared or longer, replacing the natural daytime lighting.

It will be noted that in a simplified version, the sensors 7 in the rim 25 might only be photodiodes designed to measure the shadow 9 cast by the finger or fingers as compared to the natural lighting or an artificial lighting situated for example in the instrument cluster.

The electronic processing unit 8 is adapted (see FIG. 5) to provide information to another third-party user system 68 which can be in the present case the instrument cluster 1 itself or another onboard system 68 connected to the instrument cluster 1 by a data transmission bus. The electronic processing unit 8 uses the information 69 on the angle of the steering wheel 2 with respect to a straight line ("steering wheel theta") to inhibit the consideration of voluntary movements of fingers during turning maneuvers, that is, with "steering wheel theta" greater than 45°, for example; in fact, in this case the correspondence of position is no longer truly assured.

When the link between electronic processing unit 8 and the third party user system 68 is by wire, this goes through a rotary contactor 66.

Optionally, it may be provided that the transmission of information from the steering wheel 2 to a non-rotary element is done by infrared, making use of infrared transmitters 7T present for the detection function, during periods when they are not requested for the detection; in this case, one does not have to go through a rotary contactor.

Figure 5:
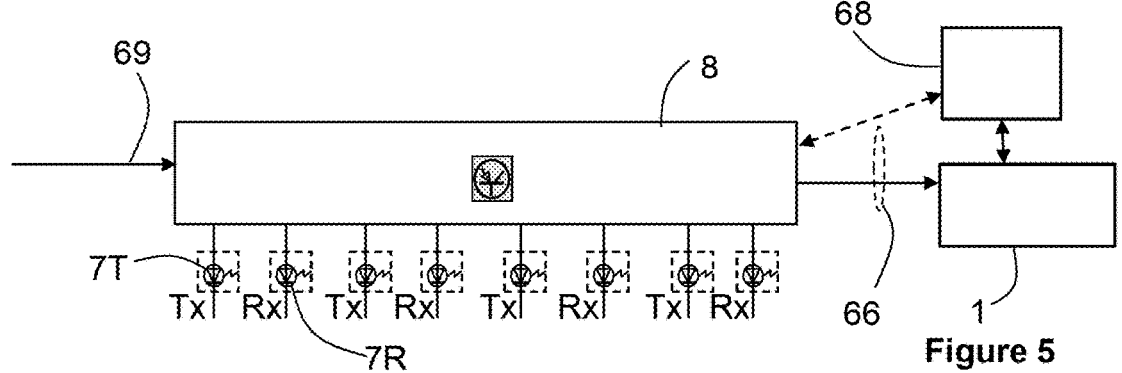
FIG. 5 shows a functional diagram of the capturing device including in particular the sensors.

As illustrated in FIG. 5, the detection system 3 comprises, besides the sensors 7 already mentioned, an electronic processing unit 8, designed to generate detection information coming from the sensors 7.

In particular, the processing unit 8 identifies which sensor (among the plurality) detects an object (occultation by a finger) and, depending on the geographical position of this sensor, it deduces the position of the finger detected on the circumference of the rim 25, for example as expressed in the form of an angular deviation with respect to the upper point of the steering wheel 29.

Moreover, the processing unit 8 can perform a recurring scan of all of the diodes; including an activating of one of the transmitting diodes 7T and measuring at the same time the level of light reception on the two adjacent receiving diodes 7R.

Figure 7:
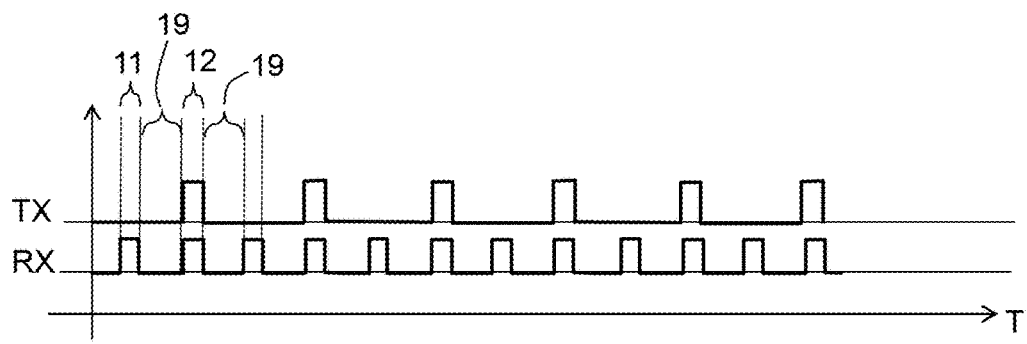
FIG. 7 shows another chronogram illustrating the detecting of the fingers of the driver's hands.

According to one advantageous aspect illustrated in FIG. 7, it is provided that the optical sensors can detect the light intensity received by the receiving diodes under natural lighting, that is, emitting diodes not activated (step /a1/, reference 11), and furthermore at a second time one illuminates and then captures the light intensity received by the receiving diodes under artificial lighting, namely, with the transmitting diodes activated (step /a2/, reference 12). Of course, the detection is preferably pulsed, that is, the moments of detection are separated by dead time referenced 19, which makes it possible to minimize the electricity consumption and be less sensitive to variations in light coming from the outside, such as sunlight interfering with trees along the road or certain urban neon lighting.

Figure 6A:
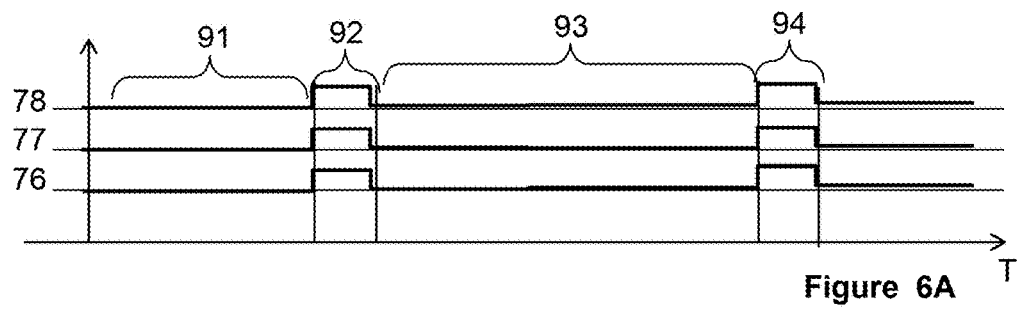
FIGS. 6A and 6B show chronograms illustrating the detecting of the fingers of the driver's hands.

As illustrated in FIG. 6A, the detection system, in order to infer a voluntary movement of double grasping (or double closing), identifies the following sequence:
- an absence of detection of fingers on three contiguous sensors 76-78 (period 91),
- a positive detection of fingers on these same sensors 76-78 (period 92),
- again an absence of detection (period 93),
- a new detection (period 94) of a closing of the hand.

Figure 6B:
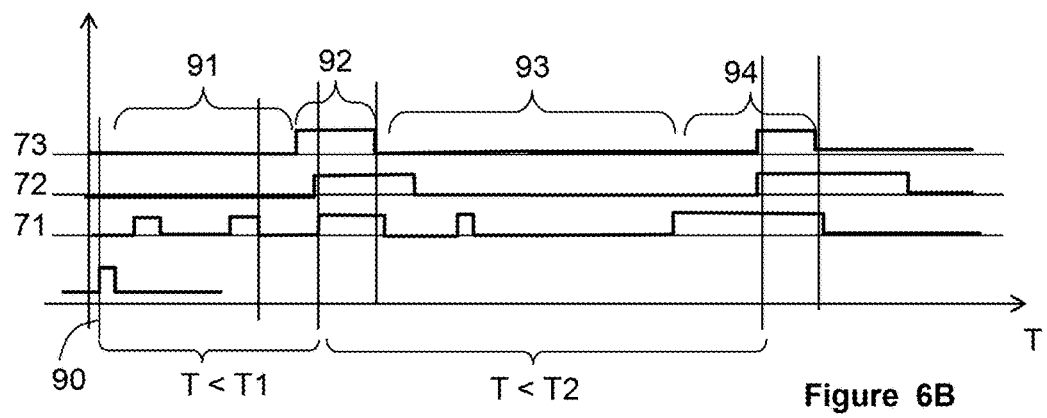

FIG. 6B presents another case with the fingers less synchronized on three other contiguous sensors 71-73 yet still denoting a double grasping or double closing.

It should be noted that the voluntary movement in question can also be a single grasping, with relatively well organized temporal characteristics in order to avoid a false detection. According to one embodiment, the user system may require a single grasping or a double grasping according to the corresponding action which is engaged.

In the case when the action is engaged by a single closing of the hand, one preferably specifies a limited time slot T1, for example with values predetermined between 5 and 10 seconds, for accepting a grasping by the hand. Thus, the desire of the driver will only be considered if he performs this closing of the hand in less than T1 seconds after the trigger event 90 (see FIG. 6B).

One may also specify that in the case of the double closing of the hand, the second closing should be done in a space of time less than T2 seconds after the first closing (see FIG. 6B).

Figure 8:
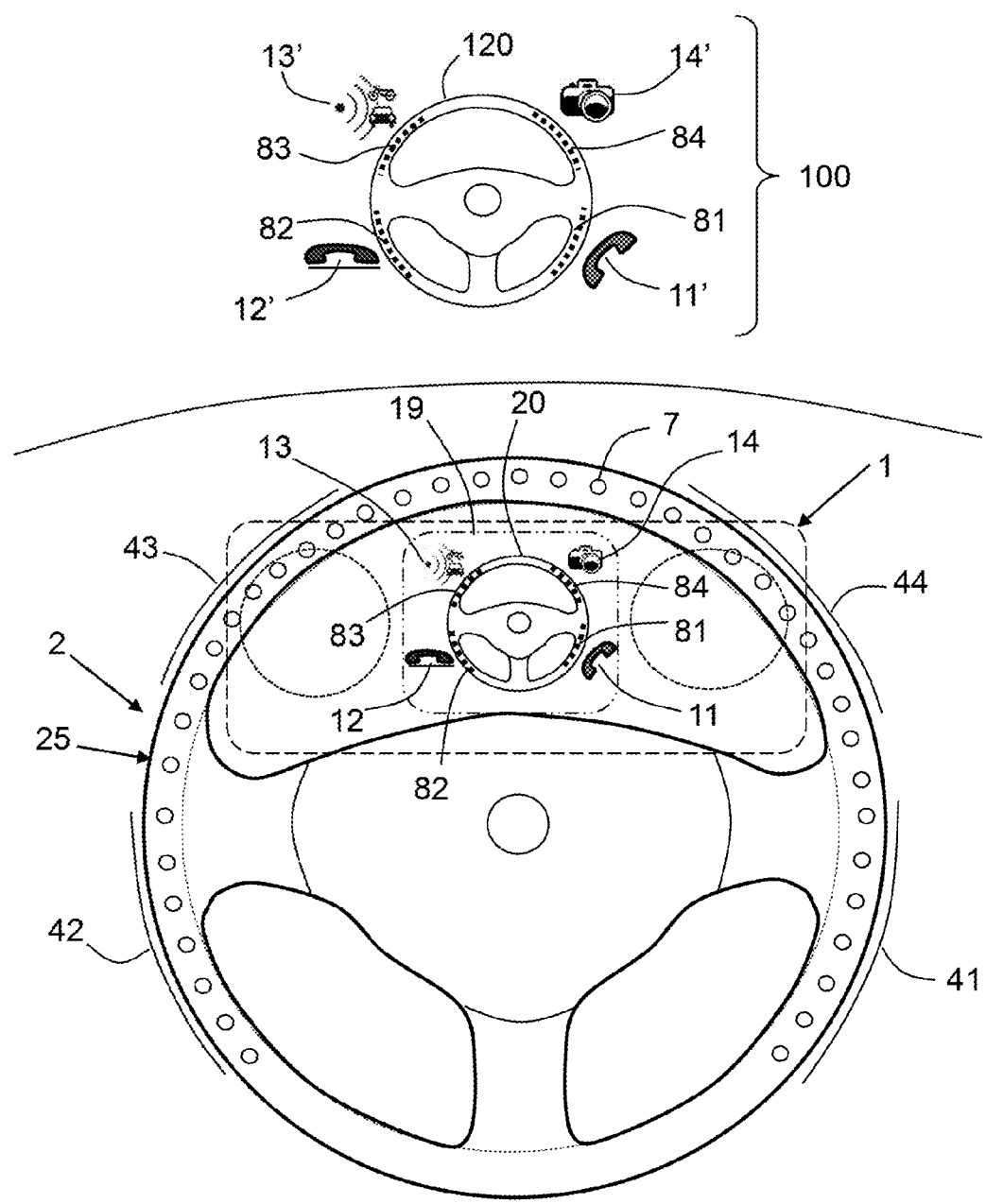
FIG. 8 is analogous to FIG. 1 and shows a supplemental functionality.

FIG. 8 shows a case with four zones of activation 41-44 on the steering wheel 2 corresponding respectively to four interaction entities 11-14, the examples of which are described below.

The first interaction entity 11 is represented as a telephone taken off the hook and the corresponding underlying action is an acceptance of an incoming telephone call. The second interaction entity 12 is represented as a telephone hung up and the corresponding underlying action is a rejecting of an incoming telephone call or the termination of a call in progress.

The third interaction entity 13 is represented as a speed control radar and the corresponding underlying action is the voluntary signaling of the presence of a speed control point on the road traveled ("scout" function). The fourth interaction entity 14 is represented as a photographic apparatus and the corresponding underlying action is the taking of photos or a video of the surroundings of the vehicle; this may allow the driver to record the photo/video data of another road user displaying dangerous conduct for others, for example.

The indication of the options presented to the driver is in the form of a tutorial display in the digital display zone 19 of the cluster, this display being preferably instant, for example, when the user performs one or two graspings of the steering wheel 2, which causes the aforementioned display to be put in place. On the pictogram of the steering wheel 20 there appear the zones of activation 81-84 forming an image of the corresponding real zones of activation 41-44 on the steering wheel 2.

It will be noted that this tutorial display can be duplicated (or replaced) by a heads-up display (HUD) system 100 on the windshield of the vehicle, the icons referenced 11', 12', 13', 14' around the icon of the steering wheel 120 corresponding respectively to the icons 11, 12, 13, 14.

The invention claimed is:

1. A method for a motor vehicle including a steering wheel connected to a steering system of the vehicle, and an instrument cluster including at least one display zone, the steering wheel including a plurality of sensors arranged on a rim of the steering wheel and configured to detect the presence of at least one finger of at least one hand of a driver of the motor vehicle in contact with or in proximity to the rim, the sensors being situated one after another in the circumferential direction, the method comprising:
defining at least a first zone of activation on the rim of the steering wheel;
defining in the display zone at least a first interaction entity situated in positional correspondence with the first zone of activation, and representative of an event or a functionality;
detecting a voluntary movement of fingers representative of at least one closing of the hand on the first zone of activation, the voluntary movement of fingers being representative of a double or triple closing or double or triple gripping of the hand on the first zone of activation; and
undertaking an action associated with the first interaction entity that is situated in positional correspondence with the first zone of activation when the voluntary movement of fingers is detected.

2. The method according to claim 1, wherein the double closing of the hand on the zone of activation is defined by the detecting of at least two fingers in contact with or pressing on the rim by at least three contiguous sensors, then an absence of detection at the same sensors, then a new detection at the same sensors, then again an absence of detection at the same sensors.

3. The method according to claim 1, further comprising defining at least one second zone of activation on the rim of the steering wheel, and at least one second interaction entity in the display zone, the first and second zones of activation being arranged symmetrically on either side of a vertical median plane of the steering wheel, the first zone of activation encompassing a nominal position of the right hand, and the second zone of activation encompassing a nominal position of the left hand.

4. The method according to claim 3, wherein the first interaction entity represents an action of acceptance of a proposal submitted to the driver, while the second interaction entity represents an action of rejection of the proposal.

5. The method according to claim 3, wherein the first interaction entity represents acceptance of a telephone call, while the second interaction entity represents a rejection of the telephone call.

6. The method according to claim 3, wherein the sensors are spaced no more than 15 mm from each other in the circumferential direction, and each of the first and second zones of activation covers an angle sector of the rim between 90° and 180°.

7. The method according to claim 1, wherein the movement of the fingers is detected on at least three contiguous fingers.

8. The method according to claim 3, wherein the instrument cluster instantly displays, in one of the display zones and/or by a heads-up display, an image of the steering wheel showing the different zones of interaction available and pictograms representative of corresponding actions.

9. A system of interaction for a motor vehicle, the system comprising:
a steering wheel connected to a steering system of the vehicle, the steering wheel including a plurality of sensors arranged on a rim of the steering wheel and configured to detect the presence of at least one finger of at least one hand of a driver of the motor vehicle in contact with or in proximity to the rim of the steering wheel, the sensors being situated one after another in the circumferential direction, the rim of the steering wheel defining at least first and second zones of activation;
an instrument cluster including a display zone, the instrument cluster defining, in the display zone, at least first and second interaction entities situated in positional correspondence, respectively, with the first and second activation zones representative of an event or a functionality; and
one or more processors configured to detect a voluntary movement of fingers including at least a multiple gripping operation by the hand on one of the zones of activation, and to undertake an action associated with the interaction entity corresponding to the zone of activation when the voluntary movement of fingers is detected.

10. The method according to claim 2, further comprising defining at least one second zone of activation on the rim of the steering wheel, and at least one second interaction entity in the display zone, the first and second zones of activation being arranged symmetrically on either side of a vertical median plane of the steering wheel, the first zone of activation encompassing a nominal position of the right hand, and the second zone of activation encompassing a nominal position of the left hand.

11. The method according to claim 4, wherein the first interaction entity represents acceptance of a telephone call, while the second interaction entity represents a rejection of the telephone call.

12. The method according to claim 4, wherein the sensors are spaced no more than 15 mm from each other in the circumferential direction, and each of the first and second zones of activation covers an angle sector of the rim between 90° and 180°.

13. The method according to claim 5, wherein the sensors are spaced no more than 15 mm from each other in the circumferential direction, and each of the first and second zones of activation covers an angle sector of the rim between 90° and 180°.

14. The method according to claim 2, wherein the movement of the fingers is detected on at least three contiguous fingers.

15. The method according to claim 3, wherein the movement of the fingers is detected on at least three contiguous fingers.

16. The method according to claim 4, wherein the movement of the fingers is detected on at least three contiguous fingers.

17. The method according to claim 5, wherein the movement of the fingers is detected on at least three contiguous fingers.

18. The method according to claim 6, wherein the movement of the fingers is detected on at least three contiguous fingers.

19. The method according to claim 4, wherein the instrument cluster instantly displays, in one of the display zones and/or by a heads-up display, an image of the steering wheel showing the different zones of interaction available and pictograms representative of corresponding actions.

20. The method according to claim 5, wherein the instrument cluster instantly displays, in one of the display zones and/or by a heads-up display, an image of the steering wheel showing the different zones of interaction available and pictograms representative of corresponding actions.

* * * * *